April 14, 1970 L. W. McKEE 3,506,316
BALL BEARING CAGE
Filed April 16, 1968
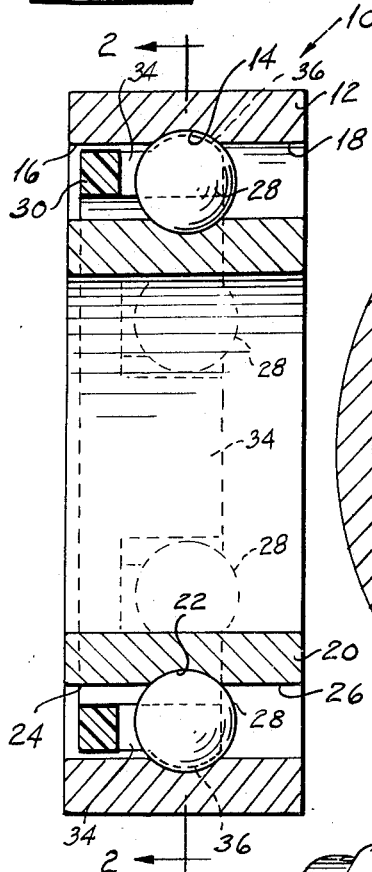
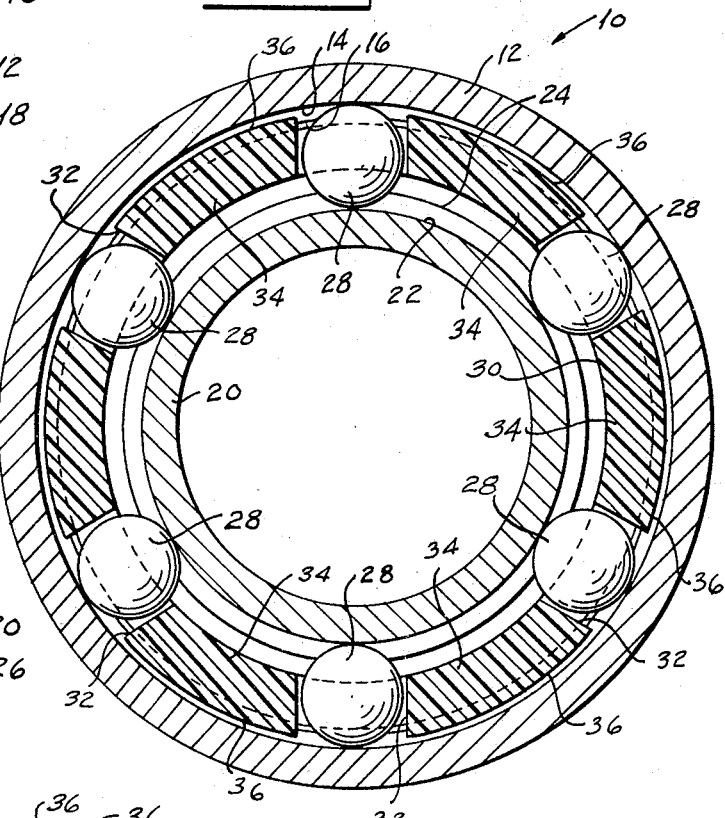
INVENTOR.
Lewis W. McKee
BY
ATTORNEYS

United States Patent Office

3,506,316
Patented Apr. 14, 1970

---

3,506,316
BALL BEARING CAGE
Lewis W. McKee, Brookfield, Conn., assignor to The Barden Corporation, Danbury, Conn., a corporation of Connecticut
Filed Apr. 16, 1968, Ser. No. 721,669
Int. Cl. F16c 19/06, 33/38
U.S. Cl. 308—193                               4 Claims

ABSTRACT OF THE DISCLOSURE

A simple side assembled cage for a deep groove bearing in which the cage is an annular body having axially extending open-ended ball-receiving slots defining ball separators having radially extending bosses adapted to snap into the raceway of one of the bearing rings when the cage is pushed into the bearing from the side thereof to hold the cage in assembled ball-separating position.

BACKGROUND OF THE INVENTION

There are known in the prior art ball separators or cages which are assembled with a bearing to hold the balls in predetermined spaced relationship. The conventional separator of the prior art is an annular body provided with a plurality of spaced ball-receiving holes or pockets.

Ball separators of the type described above are used with both angular contact and with deep groove bearings. In angular contact bearings the raceway of one of the rings is bounded at one edge either by a very low land or no land at all is provided at that edge. Assembly of the balls and separators in such a bearing is a relatively simple matter since the separator and balls can easily be slipped into the space between the rings from the side.

The problem of assembling the separator and balls in a deep groove bearing is considerably more involved than in the case of an angular contact bearing described above. In a deep groove bearing each of the rings has a raceway bounded at its edges by relatively high lands. In most instances in order to assemble the separator in position between the rings, the separator or cage is split into two annular halves which are moved into the bearing from the two sides thereof with the balls properly positioned in the pockets thus formed and the halves are secured together in any suitable manner.

Unsuccessful attempts have ben made in the prior art to provide a simple and inexpensive ball separator or cage which can rapidly and expeditiously be assembled in a deep groove bearing. Such retainers of the prior art have been unsuccessful for various reasons. In some such cages ultimately the wear between balls and retainer elements may be so great that the cage falls away from the bearing. Most of the proposed structures are difficult to fabricate and are, consequently, expensive.

I have invented a side-assembled ball bearing cage which overcomes the defects of bearing separators or cages of the prior art. My separator does not rely on the balls to retain it in assembled position on the bearing. My separator minimizes contact area with separator pocket walls with resulting lower friction. It may be assembled on a deep groove bearing in a rapid and expeditious manner. It is extremely simple to fabricate for the result achieved thereby.

SUMMARY OF THE INVENTION

One object of my invention is to provide a ball bearing separator which overcomes the defects of ball bearing separators of the prior art.

Another object of my invention is to provide a ball bearing separator which is especially adapted for use with a deep groove bearing.

A further object of my invention is to provide a ball separator which can be assembled with a deep groove bearing in a rapid and expeditious manner.

Still another object of my invention is to provide a deep groove ball bearing separator which does not rely on balls to retain it in assembled condition.

A still further object of my invention is to provide a deep groove ball bearing separator which minimizes contact area with the pocket walls thereby providing lower friction.

Yet another object of my invention is to provide a deep groove ball bearing separator which is simple to fabricate.

Other and further objects of my invention will appear from the following description.

In general my invention contemplates the provision of a ball separator for a deep groove bearing in which an annular body has a plurality of spaced axially extending open-ended slots forming ball pockets between separator portions having radially extending bosses which are adapted to snap into the grooves of one of the bearing rings as the separator is assembled on the bearing. The bosses provided on the separator portions may extend radially outwardly so as to be received by the raceway of the outer bearing ring or they may extend radially inwardly so as to be received by the raceway of the inner bearing ring.

BRIEF DESCRIPTION OF THE DRAWINGS

In the accompanying drawings which form part of the instant specification and which are to be read in conjunction therewith and in which like reference numerals are used to indicate like parts in the various views:

FIGURE 1 is a sectional view of a deep groove bearing provided with one form of my deep groove bearing ball separator.

FIGURE 2 is a sectional view of the bearing illustrated in FIGURE 1 taken along the line 2—2 of FIGURE 1.

FIGURE 3 is a perspective view of the form of my deep groove ball separator employed in the bearing illustrated in FIGURES 1 and 2.

FIGURE 4 is a fragmentary sectional view of a deep groove bearing employing an alternate form of my deep groove ball bearing separator.

DESCRIPTION OF THE PREFERRED EMBODIMENT

Referring now to FIGURES 1 to 3, I have shown a deep groove bearing, indicated generally by the reference character 10, comprising an outer ring 12 formed with a deep raceway 14 bounded along both edges by lands 16 and 18.

The bearing 10 includes an inner ring 20 formed with a deep groove 22 bounded along its edges by lands 24 and 26. The rolling elements or balls 28 of the bearing 10 are assembled between the rings 12 and 20 in the raceways 14 and 22 in the manner known to the art. After the balls 28 have been assembled in the raceways, to complete the bearing structure it remains only to assemble a suitable separator with the bearing so as to hold the balls in predetermined spaced relationship around the bearing.

My improved bearing separator is integrally formed from any suitable material having some degree of resiliency for a reason which will be explained hereinafter. For example, the separator may be formed from phenolic resin or any other suitable synthetic resin. Alternatively it might be made from any other material having the characteristics required for the separator.

My improved deep groove ball separator includes an annular body 30 having a plurality of axially extending, open-ended slots 32 providing ball pockets in a manner to be described. There remains between each pair of adjacent ball pockets or slots 32 a ball separator portion or arm 34. Each arm or separator portion 34 has adjacent its end a radially extending boss 36 having such a cross-sectional shape as to conform to the outer ring raceway 14. In assembling the separator with the bearing, it is merely pushed into the space between the outer ring 12 and the inner ring 20 from the lefthand side, for example, as viewed in FIGURE 1. It will readily be appreciated that the outer diameter of the separator in the region of the bosses 36 is greater than the inner diameter of the outer ring 12 and is slightly less than the inner diameter at the bottom of the raceway 14. Owing to that fact, as the separator is pushed into the bearing in the manner described, the arms or separator portions 34 are cammed slightly inwardly until the bosses 36 enter the raceway 14 so as to permit the arms to snap outwardly to their normal positions. It is for that reason that the material of which the separator is made must have some degree of resilience. It will be appreciated also that the outer diameter of the annular body 30 is less than the inner diameter of the outer ring 12. Moreover, the inner diameter of the annular body 30 is greater than the outer diameter of the inner ring 20.

My improved deep groove bearing ball separator may be rapidly and expeditiously fabricated. For example, beginning with cylindrical stock of a material which is able to be machined, the stock may first be cut to length and then turned so as to form a peripheral bead from which the bosses 36 can be made. After the turning operation, the slots 36 may be milled in the body, thus to provide the separator portions 34. It will be appreciated that as a result, the slots 32 have straight sides. This description of the manner in which the wall separator is made is given by way of example only. It will be understood that the separtator may be formed in any other suitable manner known to the art.

Referring now to FIGURE 4, I have shown another form of my improved deep groove ball separator or cage in use on the bearing 10. This form of my separator includes an annular body 38 having a plurality of axially extending slots 40 for receiving the balls 28. I provide each of the separator portions of the form of my cage shown in FIGURE 4 with a plurality of radially inwardly extending bosses 42. In assemblying the form of my separator shown in FIGURE 4 on the bearing 10, I may push it in from the righthand side, as viewed in FIGURE 4, into the space between the outer ring 12 and the inner ring 20. In the course of that operation, the separator portions are cammed slightly radially outwardly until the bosses 42 ride into the inner ring raceway 22. It will be appreciated that the inner diameter of the separator in the region of the bosses 42 is less than the outer diameter of the ring 20 and slightly greater than the outer diameter of the ring 20 at the bottom of the raceway 22. It is further to be understood that the bosses 42 are so shaped as to conform to the shape of the raceway 22 although good conformity is not essential.

In use of the form of my ball separator illustrated in FIGURES 1 to 3, with a deep groove bearing such as the bearing 10, the balls 28 first are assembled between the rings 12 and 20 in the raceways 14 and 22 in the manner known in the art. Next, the separator is pushed into the space between the rings until the retaining bosses 36 ride into the raceway 14. In the course of this operation care is taken to ensure that each of the balls 28 enters one of the pockets 32. With the parts thus assembled, the balls are properly positioned without the danger that excessive wear on the pocket walls will affect the retention of the separator. Stated otherwise, I rely on the bosses 36 which are disposed in the raceway 14 to hold the separator or cage in its assembled position rather than relying on some engagement between the balls and the separator.

The use of the form of my deep groove bearing ball separator shown in FIGURE 4 is similar to that described hereinabove in connection with FIGURES 1 to 3. The separator merely is pushed into the space between the outer ring 12 and the inner ring 20 until the bosses 42 ride into the inner ring raceway 22. Again, the separator is held in position without the danger that excessive wear between the balls and the walls of the separator pockets will affect the retention of the separator.

It will be seen that I have accomplished the objects of my invention. I have provided a ball separator which is especially adapted for use with deep groove bearings. My separator can be assembled with a deep groove bearing in a rapid and expeditious manner. My separator is retained in assembled position with a bearing without danger that excessive wear of the ball pocket walls will affect the retention of the separator. My improved deep groove bearing ball separator is easy to fabricate.

It will be understood that certain features and subcombinations are of utility and may be employed without reference to other features and subcombinations. It is further obvious that various changes may be made in details without departing from the spirit of my invention. It is, therefore, to be understood that my invention is not to be limited to the specific details shown and described.

Having thus described my invention, what I claim is:

1. A deep groove bearing and separator assembly including in combination, an integral inner ring having a deep groove raceway and inner and outer shoulders at the edges of said raceway, an integral outer ring having a deep groove raceway and inner and outer shoulders at the edges of said raceway, balls disposed in said raceways between said rings, and an integral ball separator of resilient material comprising a generally cylindrical annular body having an outer diameter less than the inner diameter of said outer ring outside its raceway and having an inner diameter greater than the outer diameter of said inner ring, said body being formed with a plurality of ball receiving slots circumferentially spaced around the longitudinal axis of said cylindrical body to form ball separator arms therein, and arcuate bosses extending radially from said arms and disposed in the raceway of one of said rings to limit axial movement of the separator in either directions, said bosses terminating with a diameter to permit said separator to be snapped into and out of position in the assembly of said balls and said rings by moving it axially into and out of the space between said rings.

2. An assembly as in claim 1 in which said bosses extend radially outwardly to engage said outer ring groove.

3. An assembly as in claim 1 in which said bosses extend radially inwardly to engage the inner ring groove.

4. An assembly as in claim 1 in which said separator is formed of synthetic resin.

References Cited

UNITED STATES PATENTS

| 951,244 | 3/1910 | Hess | 308—201 |
| 2,357,196 | 8/1944 | Hickling | 308—201 |
| 3,044,278 | 7/1962 | Geisthoff | 308—201 XR |
| 3,157,443 | 11/1964 | Draudt | 308—201 |

MARTIN P. SCHWADRON, Primary Examiner

F. S. SUSKO, Assistant Examiner

U.S. Cl. X.R.

308—201